UNITED STATES PATENT OFFICE.

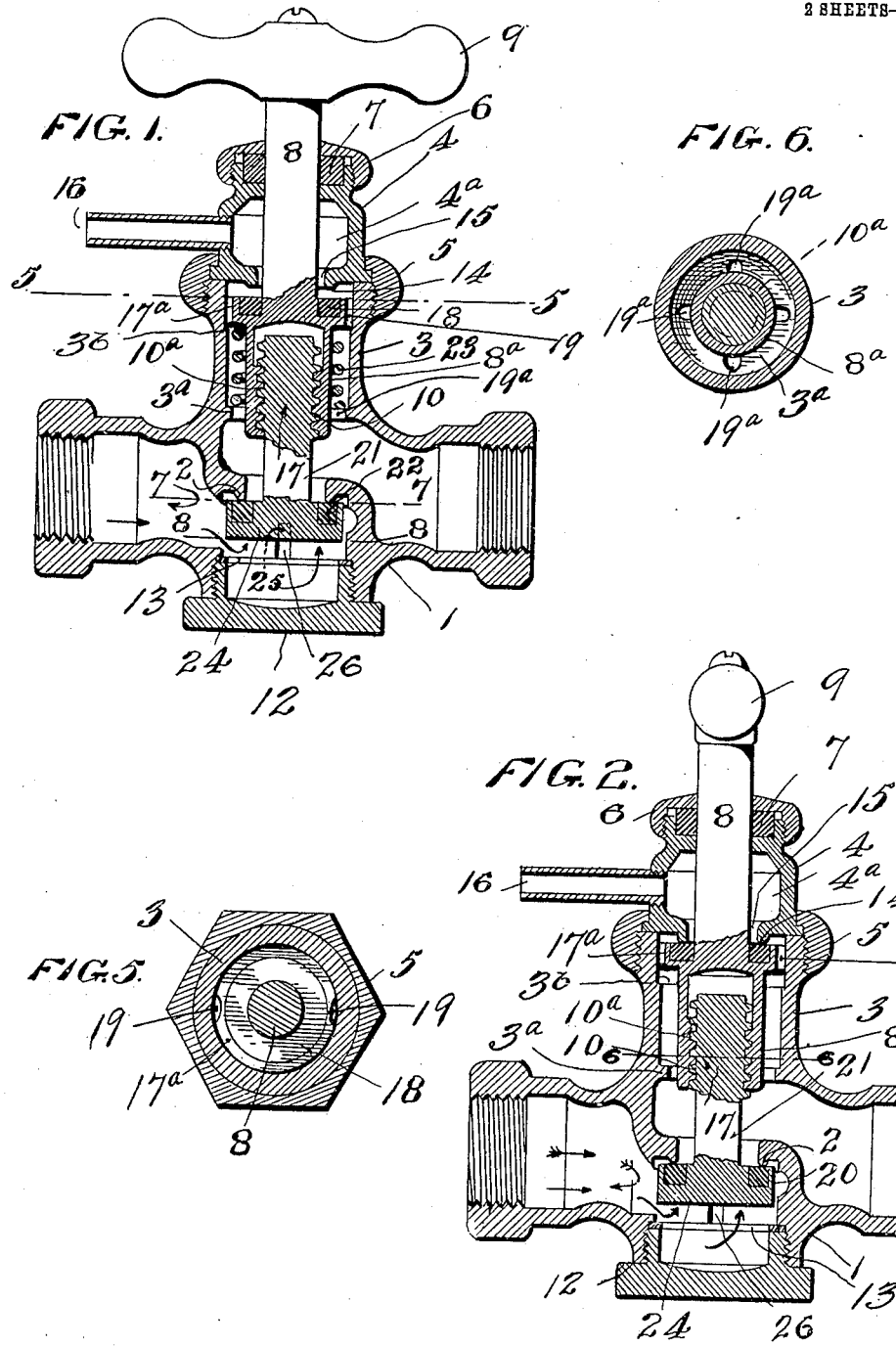

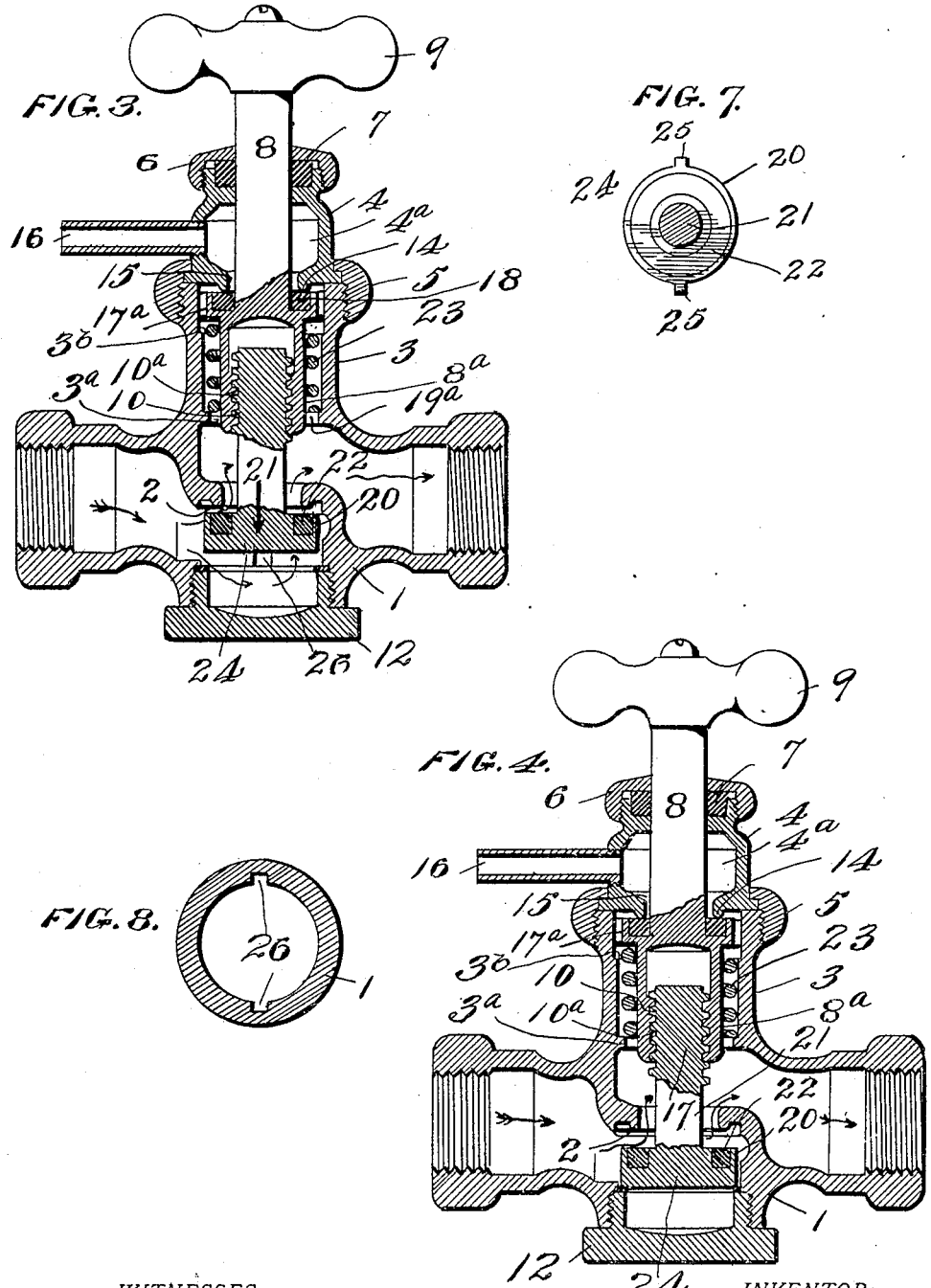

ANTON C. SCHUERMANN, OF DECATUR, ILLINOIS, ASSIGNOR TO H. MUELLER MANUFACTURING COMPANY, OF DECATUR, ILLINOIS, A CORPORATION OF ILLINOIS.

COMPRESSION STOP AND WASTE.

No. 927,683.  Specification of Letters Patent.  Patented July 13, 1909.

Application filed November 13, 1907. Serial No. 402,044.

*To all whom it may concern:*

Be it known that I, ANTON C. SCHUERMANN, a citizen of the United States, and resident of Decatur, Macon county, State of Illinois, have invented certain new and useful Improvements in Compression Stops and Wastes; and my preferred manner of carrying out the invention is set forth in the following full, clear, and exact description, terminating with claims particularly specifying the novelty.

This invention is applicable to stop and waste cocks or faucets, to hydrants, and to any other appliances that act on the stop-and-waste principle.

The principal object of the present invention is to construct a compression stop and waste in which the initial pressure assists in closing the main valve and holds it closed, and while it is open assists in closing the waste valve and holds it closed—thereby doing away with the necessity for a spring, although I preferably employ one for the purpose described.

Further objects are to connect the two valves in such manner that they shall be operated positively, and to construct the parts and arrange their operation in such manner that the initial pressure will never reach the aperture in the bonnet through which the stem projects.

The invention is exemplified in the structure hereinafter described, and it is defined in the appended claims.

In the drawings forming part of this specification, the first four figures are central sectional views taken lengthwise through a stop and waste cock embodying my invention. In Fig. 1 the main valve is shown closed and the waste valve open; in Fig. 2 both valves are shown closed and the spring is omitted entirely—this views perhaps best illustrating how the pressure alone will hold the valves against their seats; in Fig. 3 the main valve is shown partially open and in the act of opening as indicated by the vertical arrow, and the waste valve is shown as closed; in Fig. 4 the main valve is shown open and the waste valve closed; Fig. 5 is a section on the line 5—5 of Fig. 1; Fig. 6 is a section on the line 6—6 of Fig. 2; and Figs. 7 and 8 are sections on the lines 7—7 and 8—8 of Fig. 1.

In the drawings the numeral 1 designates the body of the cock which is here shown as of inverted T shape with a through passage across its head interrupted by a partition having a valve seat 2, and 3 is a lateral cylindrical extension whose axis alines with that of the seat. The cap or bonnet 4 having interior waste chamber $4^a$ is connected in any suitable manner with the extension 3, and as here shown a coupling nut 5 is swiveled on one member and threaded onto the other. The waste valve seat 14 is preferably formed within and as a part of the cap 4, and is herein shown as surrounding the stem with an annular passage 15 between them which communicates with the waste outlet 16.

Above the waste valve seat and preferably at the upper end of the cap 4 is located packing 7 which is compressed by a packing nut 6, and the initial pressure never reaches these elements for the reasons set forth below.

A valve stem 8 extends through the nut 6 and packing 7 and loosely through the passage 15, its upper or outer end having a suitable handle 9. Its inner end is here shown as enlarged as at $8^a$ and internally threaded as at $10^a$ to engage external threads 10 on the shank 17 of the main valve 24. The latter number has been applied to what might be termed the head of this valve, between which and the shank 17 is a smooth and preferably reduced neck 21, and as herein illustrated the head of the main valve has a shell 20 within which is located the main valve ring 22 shaped and adapted to close upwardly against the seat 2. Said head 24 has radial projections or ribs 25 as seen in Fig. 7 which loosely engage upright grooves 26 formed within the body 1, whereby the main valve is permitted to move straight toward and from its seat while the stem 8 and connected parts have both rotary and longitudinal movements. Preferably formed integral with the stem about where shown is a shell $17^a$ in which is seated the waste valve ring 18 that opens from and closes against its seat 14. Axially in line with these parts is formed an opening (see Fig. 8) through the bottom of the body which is of proper size and shape to permit the removal of the main valve, and this opening is normally closed by a nut or plug 12, possibly made tight by a gasket 13. By unscrewing the coupling nut 5 and removing the bonnet 4, the stem and waste valve can be withdrawn. Hence the plug 12 and coupling 5 permit the separation of parts.

It is not necessary to the successful working of this device that the spring about to be described shall always be employed, and it is purposely omitted in Fig. 2 which view perhaps best indicates how the pressure without the spring will tend to hold both valves closed.

Within the extension 3 is formed an annular shoulder $3^a$ through which the enlarged inner end $8^a$ of the stem moves freely, and as seen in Fig. 6 the shoulder has notches $19^a$ through which the fluid may flow. Between this shoulder and another fast on the stem or its enlargement (here shown as the lower side of the shell $17^a$) is located an expansive spring 23, here consisting of a coil surrounding the enlargement between it and the inner wall of the extension 3. The shell $17^a$ may fit loosely within the extension, but by preference I fit it closely although movably above a shoulder $3^b$ therein and provide it with exterior notches 19 as seen in Fig. 5 through which the fluid passes. The shoulder $3^b$ and the shoulder formed by the upper end of the nut or plug 12 constitute positive stops to limit the opening movements of the waste valve and main valve respectively. The spring assists in the movements of the valves as described below, but its special function is to overcome the probable existence of gummy matter or substances which are so often present in the water or other fluid with which this device is to be used. It is understood, however, that the spring and shoulder could be entirely omitted without departing from the spirit of my invention, and many other major and minor changes could also be adopted. The sizes, shapes, proportions, and materials of parts are not essential.

In the operation of the complete device, the main valve stands closed and the waste valve open as shown in Fig. 1, and the waste liquid under waste pressure only may be flowing upward through the notches $19^a$ and through the coils of the spring if it be employed, through the notches 19, through the waste passage 15 into the chamber $4^a$, and out the waste outlet 16. If the spring is employed its expansive force tends to raise the valve stem and hold the main valve seated, but in any event the initial pressure holds said valve seated. Turning of the handle 9 in one direction will approximate the two valves and put more tension on the spring if it be employed. When the shell $17^a$ of the waste valve strikes the shoulder or stop $3^b$ in the extension, further descent of the former is checked, and continued turning of the handle in this direction will therefore draw the main valve positively upward and press it more tightly against its seat. But the turning of said handle in the other direction will raise the waste valve (the spring assisting if it be employed) until it stands closed as seen in Fig. 2 when the initial pressure beneath the main valve will, through the stem and screw, hold both it and the waste valve closed. In this view the spring has been purposely omitted as above explained. After the waste valve has closed against its seat, continued turning of the handle will positively unseat the main valve against the initial pressure which therefore tends the more tightly to seat the waste valve, and when the parts reach the position shown in Fig. 3 the inflow of liquid past the main valve brings the initial pressure directly in contact with the waste valve and holds it closed during the further operation of the device, thereby again rendering the spring unnecessary. Continued turning of the handle positively moves the main valve to the position shown in Fig. 4 where it stands wide open, and resting against its stop which is the nut 12, with the waste valve held positively closed; and the full head of the liquid is flowing through the device. Here also the pressure without the spring would hold the waste valve closed. On a return movement of the parts from this position, turning of the handle in the opposite direction positively restores them to the position shown in Fig. 3, and then to that shown in Fig. 2, and up to the moment the main valve strikes its seat some portion of the initial pressure is always exerted directly upon the waste valve so that it would be held closed if the spring were omitted. As soon as the parts resume the position shown in Fig. 2 the full force of the initial pressure is exerted to hold the main valve closed, and, through the stem, to also hold the waste valve closed. After the initial pressure within the extension 3 has been cut off and reduced to the degree that it has passed through the valve by reason of the consumption, continued turning of the handle in this direction positively unseats the waste valve (against the force of the spring if it be employed) and opens the waste outlet so that the parts are restored to the position shown in Fig. 1 as above described. Finally, an additional turn of the handle in this direction will draw the waste valve down onto stop $3^b$ and hence press the main valve more tightly against its seat. Thus it will be seen that during all steps of the opening and closing movements of this device, both valves are operated positively by means of their direct connection through the screw with each other; at no time is the spring absolutely necessary, or are both valves open simultaneously; at no time can the initial pressure reach the packing 7, and, indeed, when the initial pressure is present in the extension at all it is exerted to close the waste valve forcibly so that it cannot reach the waste chamber $4^a$; and each valve is positively moved in either direction relatively to the position of the other while the latter is held seated by the pressure.

The presence of positive stops adjacent but opposed to the valve seats, so that each valve has a movement between its seat and stop, is especially useful in a device of this character for the reason that when either valve has been fully opened against its stop further turning of the stem in the proper direction will forcibly close the other valve against its seat.

What is claimed as new is:

1. In a compression stop and waste, the combination with a body having a through passage provided with a main valve seat, a lateral extension of the body in line with the seat, an annular shoulder therein provided with notches, a bonnet connected with the extension and communicating with a waste outlet, and a waste valve seat between said outlet and main valve seat; of independent valves for said seats, a stem passing through the bonnet and having an enlarged shell carrying the waste valve, a coiled expansive spring between said shoulder and shell, means for guiding the main valve longitudinally, and a screw connection between this valve and said stem.

2. In a compression stop and waste, the combination with a body having a through passage provided with a main valve seat, a lateral extension of the body in line with the seat, an annular shoulder therein provided with notches, a bonnet connected with the extension and communicating with a waste outlet, and a waste valve seat between said outlet and main valve seat; of independent valves for said seats, a stem passing through the bonnet and having an enlarged shell carrying the waste valve, the inner end of the stem being enlarged and internally threaded, a coiled expansive spring surrounding said enlarged portion between said shoulder and shell, means for guiding the main valve longitudinally, and a shank on the latter having external threads engaging those of the stem.

3. In a compression stop and waste, the combination with a body having a through passage provided with a main valve seat, a lateral extension of the body in line with the seat, an annular shoulder therein provided with notches, a bonnet connected with the extension and communicating with a waste outlet, and a waste valve seat between said outlet and main valve seat; of independent valves for said seats, a stem passing through the bonnet and having an enlarged shell carrying the waste valve, the inner end of the stem being enlarged to fit said notched shoulder and internally threaded, a coiled expansive spring surrounding said enlarged portion between said shoulder and shell, means for guiding the main valve longitudinally, and a shank on the latter having external threads engaging those of the stem.

4. In a compression stop and waste, the combination with a body having a through passage provided with a main valve seat, a lateral extension of the body in line with the seat, an annular shoulder therein provided with notches, a bonnet connected with the extension and communicating with a waste outlet, and a waste valve seat between said outlet and main valve seat; of independent valves for said seat, a stem passing through the bonnet and having an enlarged shell provided with notches, said shell carrying the waste valve, a coiled expansive spring between said shoulder and shell, means for guiding the main valve longitudinally, and a screw connection between this valve and said stem.

5. In a compression stop and waste, the combination with a body having a main valve seat, a lateral extension of the body, an annular shoulder therein provided with notches, a bonnet communicating with a waste outlet, and a waste valve seat between said outlet and main valve seat; of independent valves for said seats, a stem passing through the bonnet and having an enlarged shell provided with notches, said shell carrying the waste valve, the stem being internally threaded, a spring between the shoulder and shell pressing the waste valve normally toward its seat, means for guiding the main valve longitudinally, and a shank on the latter having external threads engaging those in the stem.

6. In a compression stop and waste, the combination with a body having a main valve seat, a lateral extension of the body communicating with a waste outlet, an annular shoulder therein provided with notches, and a waste valve seat between said outlet and main valve seat; of independent valves for said seats, a stem having an enlarged shell provided with notches, said shell carrying the waste valve, the inner end of the stem being enlarged to fit said notched shoulder and internally threaded, a spring between the shoulder and shell, means for guiding the main valve longitudinally, and a shank on the latter having external threads engaging those in the stem.

7. In a compression stop and waste, the combination with a body having a through passage with a main valve seat, a lateral extension of the body in line with said seat and communicating with a waste outlet, and a waste valve seat between said outlet and main valve seat; of independent valves for said seats both closing with the pressure, a spring for assisting in the closing of the waste valve, means for moving one of the valves from the exterior, a screw connection between the valves, and positive stops within the body and its extension for checking the opening movement of each valve whereby when one valve is so checked the other can be tightly seated by proper manipulation of said means.

8. In a compression stop and waste, the combination with a body having a through passage with a main valve seat, a lateral extension of the body in line with said seat and communicating with a waste outlet, and a waste valve seat between said outlet and main valve seat; of independent valves for said seats both closing with the pressure, a spring for assisting in the closing of the waste valve, a stem and handle for moving the waste valve from the exterior, a screw connection between the valves and positive stops within the body and extension for checking the opening movement of both valves whereby when the main valve is so checked the waste valve can be tightly seated by proper manipulation of said handle.

9. In a compression stop and waste the combination with a body having a main valve seat and a positive stop adjacent it, a lateral extension of the body having a waste valve seat and an internal shoulder constituting a positive stop adjacent it, and a waste outlet with which said extension communicates; of independent waste and main valves respectively between their adjacent seats and stops both closing with the pressure, a stem for moving the waste valve from the exterior of the body, a screw connection between said stem and main valve, and means for guiding the latter straight to and from its seat.

10. In a compression stop and waste, the combination with a body having a main valve seat and a positive stop adjacent it, a lateral extension of the body having a waste valve seat and an internal shoulder constituting a positive stop adjacent it, and a waste outlet with which said extension communicates; of independent waste and main valves respectively between their adjacent seats and stops both closing with the pressure, a shoulder within the extension, an expansive spring between the shoulder and waste valve for assisting in its closing, a stem for moving the waste valve from the exterior of the body, a screw connection between said stem and main valve, and means for guiding the latter straight to and from its seat.

11. In a compression stop and waste, the combination with a body having a horizontal passage provided with a main valve seat and an opening below it, upright grooves within the body leading to said opening, a plug for closing the opening, an upright extension of the body in line with the seat, a removable bonnet connected with the extension and communicating with a waste outlet, and a waste valve seat carried by the bonnet; of a main valve below its seat and having ribs guided in said grooves, the valve and ribs adapted to pass through said opening, a waste valve below its seat, means for turning it in either direction, and a screw connection between said valves.

12. In a compression stop and waste, the combination with a body having a through passage provided with a main valve seat and an opening below it, upright grooves within the body leading to said opening, removable means for closing the opening, an upright extension of the body in line with the seat and communicating with a waste outlet, and a waste valve seat at the upper end of the extension; of a main valve below its seat and having ribs guided in said grooves, the valve and ribs adapted to pass through said opening, a waste valve below its seat, and connections between said valves for approximating and separating them.

13. In a compression stop and waste, the combination with a body having a through passage and a valve seat, a lateral extension of the body in line with said seat, a bonnet connected with the extension and communicating with a waste outlet, a packed nut on the bonnet above said outlet, and a waste valve seat between said outlet and main valve; of independent valves for said seats, both adapted to close with the pressure, means within the body for guiding the main valve straight to and from its seat, a waste valve stem extending through said nut and packing, and a screw connection between the stem and the main valve whereby each valve closes before the other valve opens and the initial pressure never reaches the packed nut.

In testimony whereof I have hereunto subscribed my signature this the first day of November, A. D. 1907.

ANTON C. SCHUERMANN.

Witnesses:
VIRGINIA HAMILTON,
JOHN L. WADDELL.